Aug. 31, 1948.  F. W. SCHWINN  2,448,329
METHOD OF ELECTRIC BRAZING METAL PARTS
Filed April 5, 1946

Inventor
FRANK W. SCHWINN
By Albert G. McCaleb
Attorney

Patented Aug. 31, 1948

2,448,329

UNITED STATES PATENT OFFICE 2,448,329

METHOD OF ELECTRIC BRAZING METAL PARTS

Frank W. Schwinn, Chicago, Ill.

Application April 5, 1946, Serial No. 659,795

3 Claims. (Cl. 219—12)

This invention relates to a method of electric brazing metal parts together and more particularly to such a method which is not only efficient and effective as a production process, but which is also applicable to tubular parts and the like, and avoids the necessity for additional finishing operations, such as grinding or the removal of flash material.

It is one of the objects of my present invention to provide a method of securing together tubular parts in angularly disposed relationship to one another and in a manner such that any uneven or unsightly parts of the joint are kept on the interior and unexposed portions of the joint.

As another object my invention comprehends the provision of a method of securing metal parts together which is both rapid and adapted to the production of consistent results.

My invention further contemplates the provision of a method for securing metal parts together and by the use of which consistent quality and neatness can be maintained without the use of highly skilled or specially trained operators.

Another object of the invention is to provide a method whereby sturdy joints are produced between tubular parts without resort to costly machine tools and machining operations.

Other objects and advantages of the invention will be apparent from the following description and the accompanying drawings in which similar characters of reference indicate similar parts throughout the several views.

In the accompanying drawings which are illustrative of my method of securing metal parts together, I have shown its adaptation to two tubular parts. Although not limited thereto, the tubular part 10 of larger diameter is the crank hanger tube of a bicycle, while the tubular part 12 of smaller diameter is one of the frame tubes of the bicycle.

Figure 1:
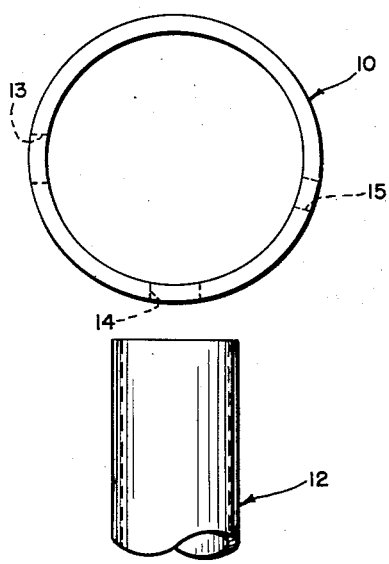
Fig. 1 is a side elevational view depicting two tubular parts in an initial stage of preparation and adapted to be secured together by my preferred method.

As depicted in Fig. 1, the larger tubular part 10 is initially pierced or drilled at circumferentially spaced positions to provide holes 13, 14 and 15 smaller in diameter than the tubes, such as 12, which are to be joined to the larger one. The positions of the holes are desirably such that they are concentric with the positions at which the smaller tubes are to be secured. Initially, the smaller tubular part 12 may be cut to a desired length and appears substantially as shown in Fig. 1.

Figure 2:
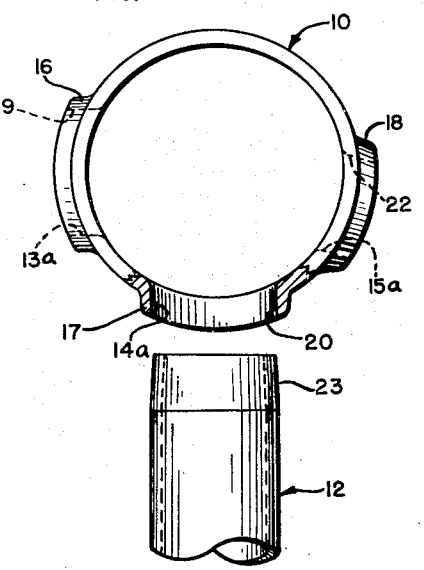
Fig. 2 is a similar side elevational view of the parts after additional steps have been taken for securing them together.

The holes 13, 14 and 15 are then desirably extruded, each to a predetermined diameter slightly smaller than the normal diameter of the tube which is to be mounted therein, as illustrated at 13a, 14a and 15a in Fig. 2. By such extrusion, integral rims 16, 17 and 18 are formed exteriorly of the tubular part 10 and adjacent each of the holes 13a, 14a and 15a, respectively. The extruded rims are even and neat in appearance, and provide extended seating surfaces 19, 20 and 22 for the ends of adjoining parts.

Figure 3:
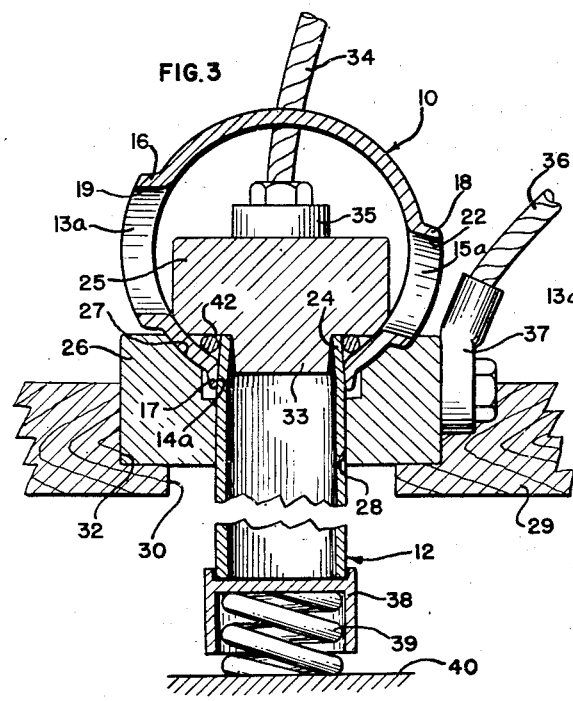
Fig. 3 is a side sectional view of the parts and is illustrative of a further step in my method of securing them together.

In order to effect insurance of a tight fit of the end of the smaller part 12 in the opening 14a, that end is preferably tapered, as indicated at 23 in Fig. 2. The length and amount of the taper is not only calculated to fit tightly when the end 23 is pressed into the opening 14a but also to provide an end marginal portion 24 on the part 12 which extends a short distance into the interior of the larger part 10, as shown in Fig. 3.

Although it is understood that there are a variety of ways in which the parts may be pressed into assembled relationship and held in such relationship while being bonded together, and that there are also a variety of ways in which heat may be applied to effect the bonding, I prefer to provide a suitable fixture in which the parts are tightly held in assembled relationship during the application of the heat which accomplishes the bonding. In the illustrated application of my method, I have shown a fixture for holding the parts together which includes electrodes 25 and 26, through which electrodes the parts are heated by current flow to accomplish the bonding.

The electrode 26 has a recess 27 in its upper surface shaped to fit the outer surface of the tubular part 10 at a position encircling the hole 14a and its adjacent rim 17. Adjoining the recess 27 is an opening 28 which fits closely about and provides passage for the outwardly extending portion of the smaller part 12. A support, such as a table 29, has an opening 30 therein and an adjoining recess 32 which fits and carries the electrode 26.

The electrode 25 has a projecting end portion 33 which fits into the end of the smaller part 12 when that part is tubular and is of a size and shape such that it can be placed in the larger tubular part 10 from one end thereof and will rest against the end surface of the smaller part 12. In order to effect a flow of current through the adjoining surfaces of the parts 10 and 12 of a magnitude such that the resistance of the joint between the parts will produce heat for melting a suitable bonding material, a conductor 34 is connected to the electrode 25 through a suitable connector 35 which is secured thereto, and a conductor 36 is connected to the electrode 26 through a suitable connector 37 secured to that electrode; both conductors being energized when desired from a suitable source of power.

Desirably, the electrodes 25 and 26 are clamped together during the bonding operation and means is provided for holding the parts together during that operation. For the purpose of the present illustrative disclosure, I have illustrated an end cap 38 which fits over the extending end of the smaller part 12 and is urged against that end to hold the parts together by a compression spring 39 disposed between the lower surface of the cap and a suitable base 40.

Figure 4:
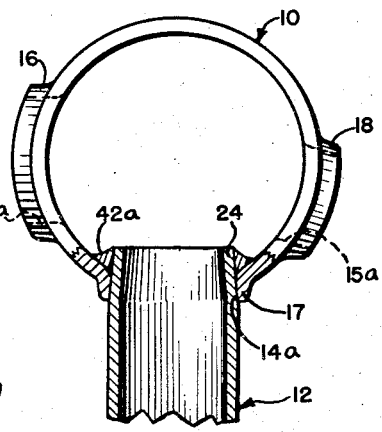
Fig. 4 is a side view with a portion shown in elevation and a portion in section to depict the parts after being secured together by my preferred method.

Prior to the insertion and clamping of the electrode 25, a suitable brazing or soldering flux is applied to the adjoining surfaces of the parts and the soldering or brazing material is placed in a position such that during the application of heat, it will flow into the joint and form a bond between the adjacent surfaces of the parts. In the present instance I have shown a ring of brazing material 42 which is placed within the larger tubular part 10 so as to rest against that part and surround the inwardly extending end marginal portion 24 of the smaller part 12. During the heating of the adjacent portions of the parts 10 and 12, the ring of brazing material is melted and flows into the joint between the parts, substantially as depicted at 42a in Fig. 4. By the provision of a ring 42 of brazing material of predetermined size, the quantity of such material is controlled to effect the formation of a neat filleted joint and to produce consistent results in quantity production.

Since the parts 10 and 12 are fitted tightly together and held in that tightly fitted relationship during the brazing operation, and since the brazing material is applied at the interior surface of the part 10, no rough or unsightly flash material will be exposed on an exterior surface so as to require a grinding or other cleaning operation for its removal. The method is further adapted to quantity production and consistent results in such production without the use of highly skilled operators by virtue of the use of established parts which are assembled in predetermined relationship and which are adapted to fixed procedure by the electrical application of heat for a predetermined and automatically controlled period, or the heating by other means in a given manner and for a predetermined time. An additional advantage of the disclosed method is that parts of the type disclosed do not require any expensive machining operations for the effective use of the process.

The terms "brazing material" and "solder," as used in this application, refer generally to the class of materials which are heated to some required temperature below the melting point of the parts to be joined in order to effect the provision of a bond between said parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. The method of securing together two tubular metal parts in angularly disposed relationship which comprises the steps of providing a side opening in one of the parts, extruding the metal adjacent said opening to enlarge the opening to a predetermined diameter and form an outwardly projecting flange at the edge of the opening, tapering the end portion of the other of said parts to fit tightly into the enlarged opening, pressing the tapered end portion of said other part into the enlarged opening to an extent such that its end margin projects linearly into said one of the parts, positioning said parts with said end margin upright, placing within said one of the parts and around the inwardly projecting end margin of the other a ring of solder of sufficient size to form between the adjacent surfaces of said parts a fillet when the solder is melted, electrically heating the adjoining portions of the parts to a temperature and for a period of time sufficient to melt the solder and effect its flow into the space between the parts, and holding the parts in fixed relationship during the heating and thereafter until the solder solidifies.

2. The method of securing together two metal parts of different sectional dimensions and the larger of which is tubular and has a side opening therein, which method comprises the steps of forming the side wall of the tubular part to provide a projecting flanged edge encircling the side opening, tapering the end portion of the smaller part to fit tightly into said opening while extending therethrough to a position such that an end margin of the smaller part is exposed in a direction radial to the axis thereof within the larger part, holding said parts together with said end margin upright, placing around said end margin and in contact with the interior of the tubular part a quantity of solder sufficient to form a fillet between the parts when melted, and heating the adjacent portions of the parts to effect the flow of solder therebetween while being thus held.

3. The method of securing together two tubular metal parts of different diameters disposed in angularly disposed relationship with a tapered end of the smaller part fitting tightly in and extending through a flanged aperture in the larger, which method comprises the steps of placing within the larger part and around the inner end of the smaller part a quantity of brazing material sufficient to provide a fillet between the adjacent surfaces of the parts when melted, clamping said parts between electrodes at positions such that current flow between the electrodes passes through the joint between the parts adjacent the brazing material, effecting a flow of current through the joint for a predetermined period of time to produce a flow of the brazing material into the joint, and holding the parts together in a position such that the natural flow of metal forms the fillet until the brazing material solidifies.

FRANK W. SCHWINN.

REFERENCES CITED

The following references are of record in the file of this patent:

UNITED STATES PATENTS

| Number | Name | Date |
|---|---|---|
| 758,503 | Blevins et al. | Apr. 26, 1904 |
| 1,538,590 | Randles | May 19, 1925 |
| 1,583,758 | White | May 4, 1926 |
| 1,897,320 | McKnight et al. | Feb. 14, 1933 |
| 2,152,812 | Money | Apr. 4, 1939 |
| 2,174,218 | Greene | Sept. 26, 1939 |
| 2,387,154 | Kalwitz | Oct. 16, 1945 |
| 2,392,886 | Stecher et al. | Jan. 15, 1946 |

OTHER REFERENCES

"Welding Handbook" (1942), pages 392–396. American Welding Society, 33 West Thirty-Ninth St., New York, N. Y.